United States Patent
Atherton et al.

(10) Patent No.: US 8,898,416 B2
(45) Date of Patent: Nov. 25, 2014

(54) STORAGE ALLOCATION MANAGEMENT IN SWITCHES UTILIZING FLOW CONTROL

(75) Inventors: William E. Atherton, Hillsborough, NC (US); Marcus A. Baker, Apex, NC (US); Eric R. Kern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1499 days.

(21) Appl. No.: 12/145,387

(22) Filed: Jun. 24, 2008

(65) Prior Publication Data

US 2008/0263308 A1     Oct. 23, 2008

Related U.S. Application Data

(63) Continuation of application No. 11/424,192, filed on Jun. 14, 2006, now abandoned.

(51) Int. Cl.
| | |
|---|---|
| *G06F 12/00* | (2006.01) |
| *G06F 13/38* | (2006.01) |
| *G06F 13/00* | (2006.01) |
| *G06F 13/28* | (2006.01) |

(52) U.S. Cl.
CPC .................................. *G06F 13/385* (2013.01)
USPC ............................ 711/170; 370/360; 370/229

(58) Field of Classification Search
CPC ..................................................... G06F 13/385
USPC ................................... 711/170; 370/360, 229
See application file for complete search history.

(56) References Cited

U.S. PATENT DOCUMENTS

| | | | |
|---|---|---|---|
| 6,084,856 A * | 7/2000 | Simmons et al. | 370/235 |
| 6,347,337 B1 | 2/2002 | Shah et al. | |
| 6,470,016 B1 * | 10/2002 | Kalkunte et al. | 370/395.41 |
| 6,760,793 B2 | 7/2004 | Kelley et al. | |
| 7,245,626 B1 * | 7/2007 | Sindhu et al. | 370/412 |
| 7,408,875 B2 * | 8/2008 | Garmire et al. | 370/229 |
| 2001/0050913 A1 * | 12/2001 | Chen et al. | 370/360 |
| 2002/0099844 A1 | 7/2002 | Baumann et al. | |
| 2004/0128410 A1 | 7/2004 | Mayhew et al. | |
| 2005/0047405 A1 | 3/2005 | Denzel et al. | |
| 2007/0294498 A1 | 12/2007 | Atherton et al. | |
| 2008/0201547 A1 | 8/2008 | Atherton et al. | |

* cited by examiner

*Primary Examiner* — Stephen Elmore
*Assistant Examiner* — Mark Giardino, Jr.
(74) *Attorney, Agent, or Firm* — Edward J. Lenart; Katherine S. Brown; Biggers Kennedy Lenart Spraggins LLP

(57) ABSTRACT

A computer program product and system for managing allocation of storage in a switch utilizing flow control are provided. The switch includes a plurality of ports and an internal storage divided into a plurality of storage units. The computer program product and system provide for monitoring an average number of storage units used by each of the plurality of ports over a predetermined time period, setting a threshold for the average number of storage units used by each of the plurality of ports, and allocating one or more available storage units assigned to a first port to a second port in response to storage allocation management being enabled for the second port and the average number of storage units used by the second port exceeding the threshold for the second port.

16 Claims, 6 Drawing Sheets

| STORAGE UNIT ADDRESS | PORT NUMBER |
|---|---|
| 00001 | 1 |
| 00002 | 1 |
| . | . |
| 02999 | 1 |
| 03000 | 1 |
| 03001 | 2 |
| 03002 | 2 |
| . | . |
| 05999 | 2 |
| 06000 | 2 |
| ..... | ..... |

412

| PORT NUMBER | AVG. USE |
|---|---|
| 1 | 2100 |
| 2 | 3000 |
| 3 | 2300 |
| 4 | 1800 |
| 5 | 1500 |
| 6 | 2800 |

410a

| PORT NUMBER | THRESHOLD |
|---|---|
| 1 | 3000 |
| 2 | 2500 |
| 3 | 2000 |
| 4 | 0 |
| 5 | 1500 |
| 6 | 0 |

STORAGE ALLOCATION MANAGEMENT IN SWITCHES UTILIZING FLOW CONTROL

CROSS-REFERENCE TO RELATED APPLICATIONS

Under 35 USC §120, this application is a continuation application and claims the benefit of priority to U.S. patent application Ser. No. 11/424,192, filed Jun. 14, 2006, entitled "STORAGE ALLOCATION MANAGEMENT IN SWITCHES UTILIZING A FLOW CONTROL", A portion of which is incorporated herein by reference.

FIELD OF THE INVENTION

The present invention relates generally to switches. More particularly, the present invention is directed to storage allocation management in switches utilizing flow control.

BACKGROUND OF THE INVENTION

There are a variety of input/output (I/O) interconnect architectures for connecting the various components of a computer system to one another. One popular I/O interconnect architecture is Peripheral Component Interconnect Express (PCI Express), which provides a high-speed interface for interconnecting computer components. Under the PCI Express architecture, one or more switches with built-in flow control are utilized to interconnect the components of a computer system.

Within each switch is a plurality of ports and an internal storage that is shared by the ports of the switch. Each port can be used to connect or link a device to the switch. The device may be a computer component, another switch, a bridge, or something else. A PCI Express link includes one or more lanes, each lane consisting of two differential pairs, in which each pair is unidirectional. Each lane in a link can usually transmit 2.5 gigabytes of data per second (GB/s).

Flow control within a switch is accomplished by assigning the internal storage to each port of the switch in units commonly referred to as credits. Each credit is associated with a location in the internal storage of the switch. The number of credits assigned to each port is typically hardwired within the switch. Hardwiring the internal storage allocation, however, can lead to waste when there are unused credits on one of the ports while another port is consistently utilizing all of its credits and would utilize additional credits if they were made available to the port.

As an example, assume a switch is connected to a 16x PCI Express device (i.e., the link between the device and the switch includes 16 lanes) on port 1 that has a maximum throughput of 40 Gigabytes/second (GB/s), a 4x PCI Express device on port 2 that has a maximum throughput of 10 GB/s, and a 4x PCI Express device on port 3 that also has a maximum throughput of 10 GB/s. Assuming each of the ports 1, 2, and 3 have been assigned 4000 credits, the port 1 device may easily use up all of it credits while the port 2 and port 3 devices are using much less than all of their credits. If, for instance, the devices on ports 2 and 3 are using, on average, 2000 of their respective credits, while the device on port 1 is continuously using all of its 4000 credits, then 4000 unused credits that could be used by the device on port 1 are being wasted in the switch.

Accordingly, there is a need for a way to allocate storage based on usage in switches that utilize flow control. The present invention addresses such a need.

SUMMARY OF THE INVENTION

A computer program product and system for managing allocation of storage in a switch utilizing flow control are provided. The switch comprises a plurality of ports and an internal storage divided into a plurality of storage units. The computer program product and system provide for monitoring an average number of storage units used by each of the plurality of ports over a predetermined time period, setting a threshold for the average number of storage units used by each of the plurality of ports, the threshold for each port being less than or equal to a total number of storage units assigned to the respective port, and allocating one or more available storage units assigned to a first of the plurality of ports to a second of the plurality of ports in response to storage allocation management being enabled for the second port and the average number of storage units used by the second port exceeding the threshold for the second port.

BRIEF DESCRIPTION OF THE DRAWINGS

FIG. 5 depicts information stored in a switch of the system in FIG. 4 according to one embodiment of the invention.

DETAILED DESCRIPTION

The present invention relates generally to computer input/output (I/O) interconnect switches and more particularly to storage allocation management in computer I/O interconnect switches that utilize flow control. The following description is presented to enable one of ordinary skill in the art to make and use the invention and is provided in the context of a patent application and its requirements. Various modifications to the implementations and the generic principles and features described herein will be readily apparent to those skilled in the art. Thus, the present invention is not intended to be limited to the implementations shown, but is to be accorded the widest scope consistent with the principles and features described herein.

Figure 1:
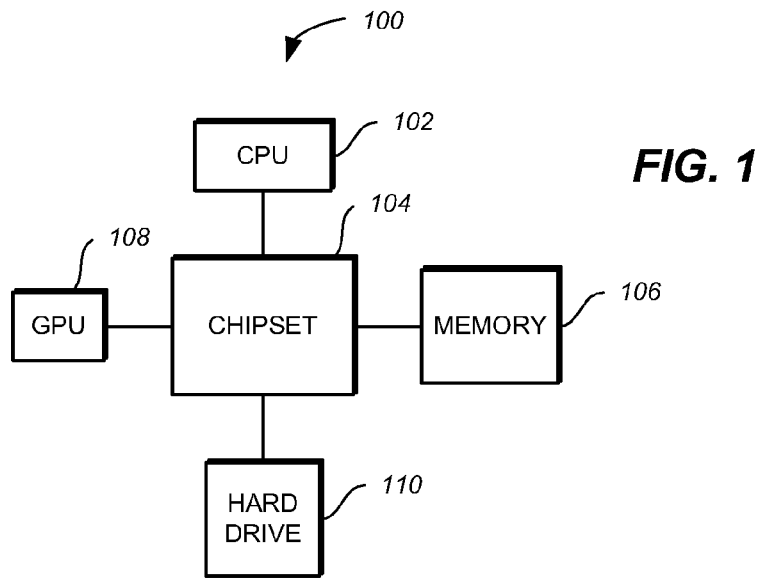
FIGS. 1-2 illustrate computer systems in accordance with various embodiments of the invention.

Illustrated in FIG. 1 is an example of how certain components of a computer system 100 are interconnected in accordance with an aspect of the invention. Computer system 100 includes a Central Processing Unit (CPU) 102, a chipset 104, a memory 106 (e.g., Random Access Memory (RAM)), a Graphics Processing Unit (GPU) 108, and a hard drive 110. CPU 102, memory 106, GPU 108, and hard drive 110 are interconnected to one another through chipset 104. Other embodiments of computer system 100 may include additional components, such as Ethernet devices, Universal Serial Bus (USB) devices, and additional processors, memory, and hard drives (not shown).

A chipset typically includes two modules, which are often referred to as a root complex and an I/O hub. Components that work very closely together and require fast access to one another, such as the CPU, memory, and GPU, are usually connected via the root complex, while other components are connected via the I/O hub. In certain instances, the functionalities of the I/O hub may be incorporated into the root complex such that an I/O hub is no longer necessary. Additionally, the GPU and memory may be connected via the I/O hub rather than the root complex in some computer systems, such as servers or workstations.

Figure 2:
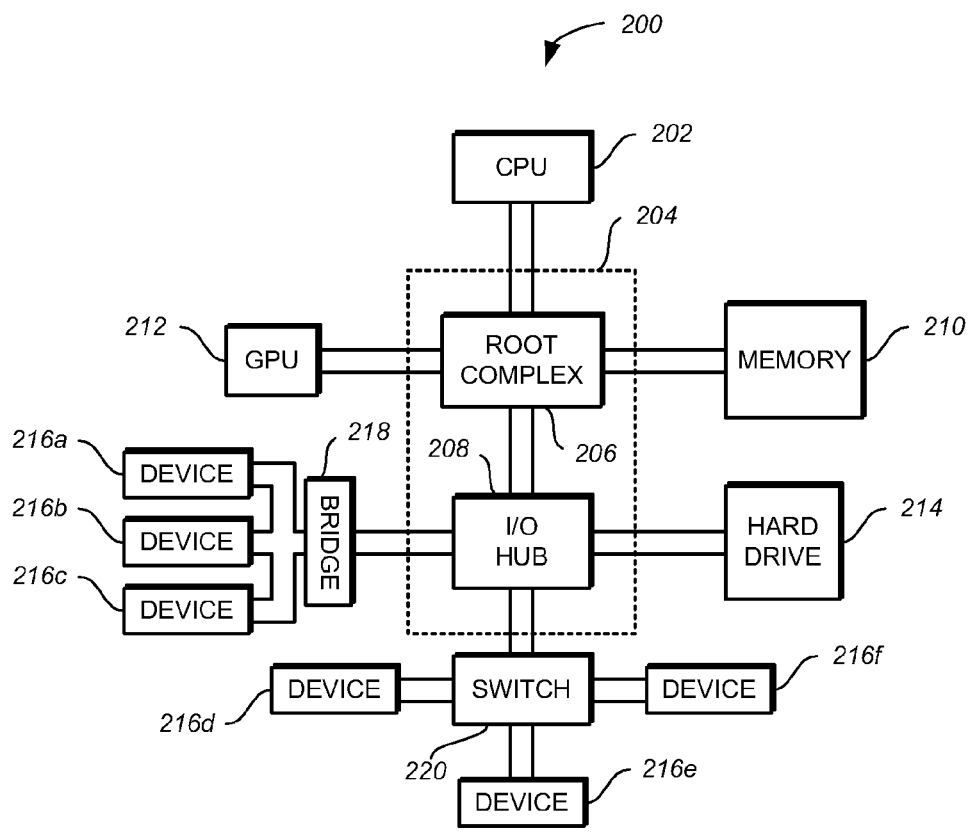

FIG. 2 shows a computer system 200 with a CPU 202, a chipset 204 that includes a root complex 206 and an I/O hub 208, a memory 210, a GPU 212, a hard drive 214, and various devices 216a-216f. CPU 202, memory 210, and GPU 212 are connected to root complex 206. Hard drive 214 is connected to I/O hub 208. Devices 216a-216c are connected to I/O hub 208 via a bridge 218 and devices 216d-216f are connected to I/O hub 208 via a switch 220. Although not shown in FIG. 2, a switch is contained within both root complex 206 and I/O hub 208. In other embodiments, bridge 218 and switch 220 may not be included in computer system 200 or additional switches and/or bridges that are external to chipset 204 may be included.

A variety of I/O interconnect architectures are available for connecting internal computer components, such as processor, memory, hard drive, etc., to one another, as well as to external computer components, such as printer, keyboard, monitor, pointing device, etc. Some of the I/O interconnect architectures currently in use include HyperTransport, InfiniBand, Peripheral Component Interconnect (PCI), PCI Extended, and PCI Express. As seen in FIG. 2, the topology or fabric of I/O interconnect architectures can vary from parallel architectures, such as devices 216a-216c being connected via bridge 218, to serial/point-to-point architectures, such as devices 216d-216f being connected via switch 220.

In I/O interconnect architectures with point-to-point topologies, such as PCI Express, internal storage allocation is usually static, e.g., hardwired into the design, and unchangeable. This may result in wasted storage space since one device may be using less than all of its allocated storage, while another device may be using all of its allocated storage and wanting to use even more, but is unable to.

Figure 3:
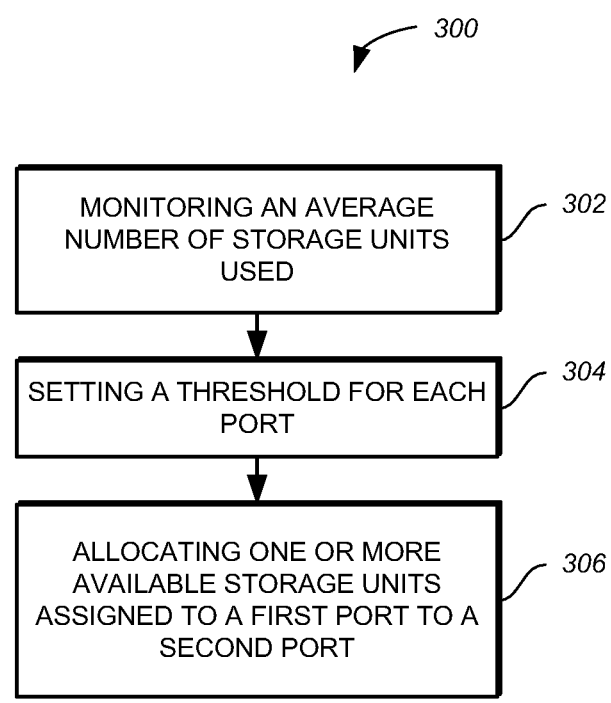
FIG. 3 is a process flow of a method for managing allocation of storage in a switch according to an aspect of the invention.

Depicted in FIG. 3 is a process 300 for managing allocation of storage in a switch according to an implementation of the invention. In the implementation, the switch comprises a plurality of ports and an internal storage divided into a plurality of storage units. At 302, an average number of storage units used by each of the plurality of ports is monitored over a predetermined time period. The predetermined time period may be anywhere from milliseconds (ms) to days. In addition, the predetermined time period may be a default value or a user-selected value. Further, the predetermined time period may be adjustable, for instance, by a user or dynamically in response to one or more statistics collected for the switch.

Monitoring of the average number of storage units used by each port may be periodic, for example, every few seconds or minutes. In one embodiment, the average number of storage units used by one or more of the plurality of ports are monitored over more than one predetermined time period, for example, over a shorter time period (e.g., 500 ms) and over a longer time period (e.g., a day), such that each of the one or more ports has a short term average number of storage units used as well as a long term average number of storage units used.

At 304, a threshold for the average number of storage units used by each of the plurality of ports is set. In one embodiment, the threshold for each port is less than or equal to a total number of storage units assigned to the respective port. As with the predetermined time period, the threshold and the total number of storage units assigned may be a default value or a user-selected value. In addition, both the threshold for each port and the total number storage units assigned to each port are adjustable. For implementations where a port has more than one average number of storage units used, different thresholds may be set for different averages. If, for instance, a port has three averages over three different time periods, then all of the averages may share one threshold, each average may have its own threshold, or two of the averages may have the same threshold while the other average has a different threshold.

One or more available storage units assigned to a first of the plurality of ports is allocated to a second of the plurality of ports at 306 in response to storage allocation management being enabled for the second port and the average number of storage units used by the second port exceeding the threshold for the second port. Allocation of the one or more available storage units may be dynamic. In one implementation, one or more storage units assigned to the first port are available for allocation when the average number of storage units used by the first port is less than the threshold for the first port.

In another implementation, the one or more storage units assigned to the first port are available for allocation only when the average number of storage units used by the first port is less than a preset percentage of the threshold for the first port. This ensures that if the first port has a burst of traffic, it will have enough storage units available. The preset percentage, like the threshold, is adjustable and may be a default value or a user-selected value. For a port with more than one threshold, the thresholds may have the same or different preset percentages.

When the first port has more than one average number of storage units used, availability of storage units may be determined based on only one average or on multiple averages. If the determination is made based on only one average, the average used may be by default or may be user-selected. On the other hand, if the determination is based on a plurality of averages, storage units assigned to the first port may be available only when each of the plurality of averages is below its respective threshold, when each of the plurality of averages is below the preset percentage of its respective threshold, or when one or more of the plurality of averages are below their respective thresholds while one or more other of the plurality of averages are below the preset percentages of their respective thresholds.

For example, assume the first port has a short term average number of storage units used and a long term average number of storage units used, where each average has its own threshold and each threshold has its own preset percentage. Storage units are deemed to be available when the short term average is below its threshold and/or the long term average is below its threshold, when the short term average is below the preset percentage of its threshold and/or the long term average is below the preset percentage of its threshold, when the short term average is below the preset percentage of its threshold and the long term average is below its threshold, or when the short term average is below its threshold and the long term average is below the preset percentage of its threshold.

The threshold for the second port is used to determine whether storage allocation management is enabled for the second port in one embodiment of the invention. For instance, the threshold can be set to zero to indicate that storage allocation management is disabled. Hence, in the embodiment, determining whether the threshold for the second port is greater than zero can be used to determine whether storage allocation management is enabled for the second port. Other methods can be used to indicate whether storage allocation management is enabled or disabled for a port, such as having a flag that can be set to indicate whether storage allocation management is enabled or disabled for a port or maintaining a table to indicate enablement or disablement of storage allocation management for each port.

Figure 4:
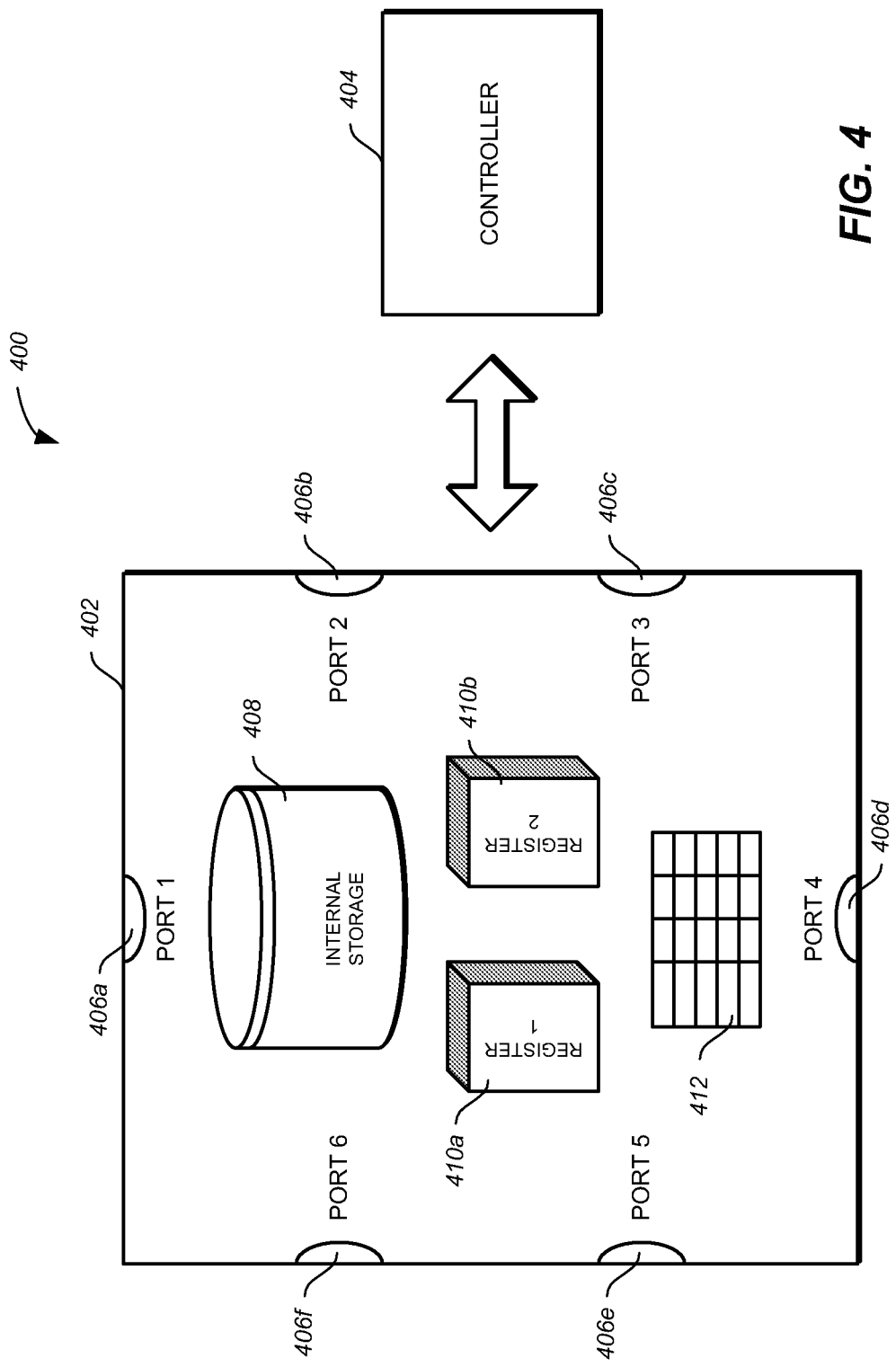
FIG. 4 shows a system for managing allocation of storage in switches in accordance with an implementation of the invention.

A system 400 for managing allocation of storage in switches is illustrated in FIG. 4 in accordance with an embodiment of the invention. As illustrated system 400 includes a switch 402 and a controller 404. Switch 402 may be an embodiment of a switch in root complex 206 or I/O hub 208, or it may be an implementation of switch 220 in FIG. 2. Controller 404 may be integrated into switch 402 or another component of system 400, such as a processor or a chipset (not shown). In addition, controller 404 may be split into multiple controllers in other embodiments. The multiple controllers may be integrated into one or more components of system 400 or may be standalone components of system 400.

Switch 402 has six ports 406a-406f, an internal storage 408, which is divided into storage units (not shown), and registers 410a-410b. Internal storage 408 and registers 410a-410b may be volatile memory (e.g., RAM) or non-volatile memory (e.g., flash memory). A table 412 is also maintained in switch 402. Table 412 may be stored in internal storage 408 or some other module within switch 402, such as a cache. Other embodiments of switch 402 may include more or less ports and may include additional modules, such as controller(s), register(s), table(s), internal storage, etc.

Controller 404, which is in communication with switch 402, is operable to monitor an average number of storage units used by each of the plurality of ports 406a-406f over a predetermined time period, set a threshold for the average number of storage units used by each of the plurality of ports 406a-406f, and allocate one or more available storage units assigned to a first of the plurality of ports 406a-406f to a second of the plurality of ports 406a-406f in response to storage allocation management being enabled for the second port and the average number of storage units used by the second port exceeding the threshold for the second port.

FIG. 5 shows information stored in registers 410a-410b and table 412 according to one implementation of the invention. In the embodiment, the average number of storage units used by each port in switch 402 is maintained register 410a and the threshold for each port in switch 402 is stored in register 410b. Registers 410a-410b may store other information not shown. As seen in FIG. 5, the threshold is being used to indicate enablement or disablement of storage allocation management. Hence, as controller 404 monitors the storage unit usage of ports 406a-406f, it will update register 410a. In addition, if storage allocation management is to be disabled or enabled for a port or the threshold for a port is to be changed, controller 404 can modify the threshold value in register 410b.

Table 412 is used to keep track of the storage units in internal storage 408 assigned to each of the ports 406a-406f. As shown in FIG. 5, each of the ports 406a-406f in switch 402 has been assigned a block of 3000 storage units. In other implementations, not all of the ports may be assigned the same number of storage units and the storage units assigned to each port may not be adjacent to one another.

When the average number of storage units used for one of the ports 406a-406f exceeds the threshold for the port, controller 404 is operable to determine whether storage units are available from another port. In the example of FIG. 5, the average usages of ports 2 and 3 are exceeding their respective thresholds, the average usage of port 5 is at its threshold, and the average usage of port 1 is below its threshold. Ports 4 and 6 are ignored because storage allocation management is disabled for those ports as the thresholds of ports 4 and 6 have been set to zero. Since there are storage units available from port 1, controller 404 can allocate the available storage units to ports 2 and 3.

The number of storage units allocated to each port in a switch may be based on need. If there are not enough available storage units for allocation to all ports in need of storage units, the available storage units may be allocated equally to the ports or some ports may have priority over other ports. This may be controlled by controller 404 or some other controller (not shown). Controller 404 can allocate available storage units from port 1 to ports 2 and 3 by reassigning the available storage units from port 1 to ports 2 and 3, e.g., updating table 412 to indicate which of the available storage units previously assigned to port 1 are now assigned to ports 2 and 3.

After allocation of storage units, controller 404 will update the thresholds of ports 1, 2, and 3 based on the reassignment of the available storage units. For instance, if 500 storage units assigned to port 1 are allocated to port 2 and 300 storage units assigned to port 1 are allocated to port 3, the threshold for port 1 will be lowered by 800, the threshold of port 2 will be increased by 500, and the threshold of port 3 will be increased by 300.

In the example of FIG. 5, although the average number of storage units used by port 3 was below the total number of storage units assigned to port 3, available storage units assigned to port 1 were allocated to port 3 because the average usage of port 3 was above its threshold. Other embodiments may require the average number of storage units used by a port to be equal to the total number of storage units assigned to the port before available storage units are allocated to the port.

Fairness in allocation of storage units may be preserved in switch 402 by returning allocated storage units back to the original port. Controller 404, in the above example, may be operable to reallocate the available storage units from ports 2 and 3 back to port 1 when an event occurs, such as when a fixed period of time elapses or when the average usage of port 1 exceeds its threshold.

Switch 402 in FIG. 4 is a PCI Express switch in one implementation. Since PCI Express uses credit-based flow control, each storage unit in the implementation is a credit, which is equal to four double words. A double word is equal to 4 bytes or 32 bits. Hence, a credit is equal to 16 bytes or 128 bits. Under the PCI Express protocol, the connection between a PCI Express switch and a PCI Express device is called a link. Each link comprises one or more lanes. A lane is able to transmit one byte of data in each direction simultaneously. Therefore, the granularity in which average credit usage is monitored may be on a finer level, such as on a lane by lane or on a directional basis rather than on a port by port basis. In addition, the ports of switch 402 in which storage allocation management is applied may be limited to those ports in which PCI Express devices are connected thereto. Ports that are connected to PCI Express devices include those ports that are connected to another PCI Express switch.

Figure 6:
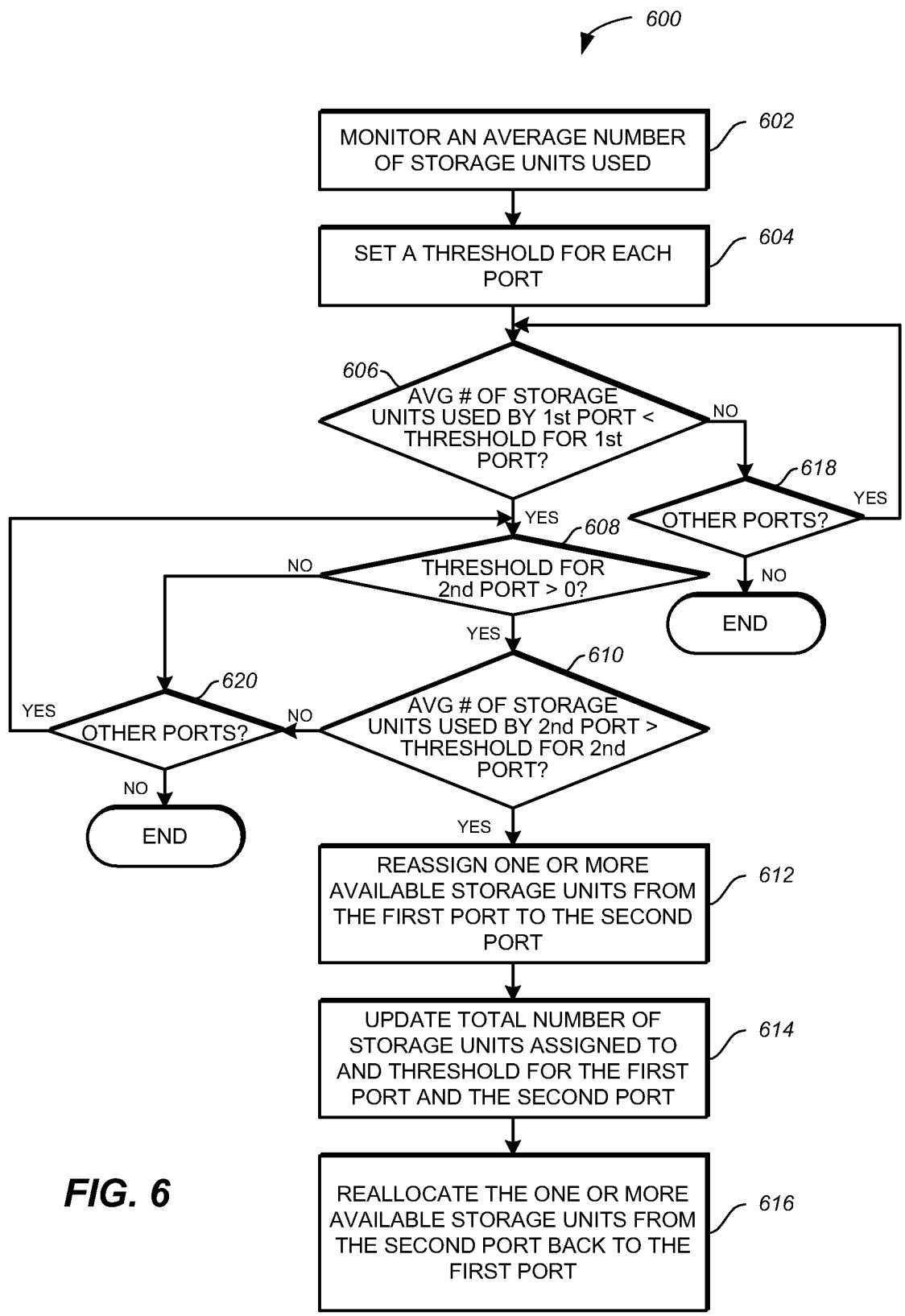
FIG. 6 illustrates a flowchart of a method for managing allocation of storage in a switch in accordance with another aspect of the invention.

Illustrated in FIG. 6 is a process 600 for managing allocation of storage in a switch in accordance with another aspect of the invention. The switch includes a plurality of ports and an internal storage divided into a plurality of storage units. At 602, an average number of storage units used by each of the plurality of ports is monitored over a predetermined time period. A threshold for the average number of storage units used by each of the plurality of ports is set at 604. The threshold for each port is less than or equal to a total number of storage units assigned to the respective port.

A determination is made at 606 as to whether the average number of storage units used by a first of the plurality of ports is less than a threshold for the first port to determine whether one or more storage units assigned to the first port are available. If one or more storage units assigned to the first port are available, a determination is made at 608 as to whether a threshold for a second of the plurality of ports is greater than zero. If the threshold for the second port is greater than zero, then a determination is made at 610 as to whether the average number of storage units used by the second port is greater than the threshold for the second port.

When the average number of storage units used by the second port is greater than the threshold for the second port, then the one or more available storage units from the first port are reassigned to the second port at 612. The total number of storage units assigned to and the threshold for the first port and the second port are then updated at 614 based on the reassignment of the one or more available storage units. At 616, the one or more available storage units are reallocated from the second port back to the first port when an event occurs, such as the passing of a fixed period of time. Reallocation of the one or more available storage units may also be dynamic.

If the determination at 606 is no, i.e., the first port does not have any available storage units, a determination is made at 618 as to whether there is another port in the switch that has not been evaluated for availability of storage units. When there is another port, the process returns to 606 to determine whether the other port, which will now be referred to as the first port, has any available storage units. When all of the other ports in the switch have been evaluated, then process 600 ends. Process 600 may begin again at 602 after a period of time has passed such that it is executed periodically.

If the determination at 608 or 610 is no, i.e., storage allocation management is disabled for the second port or the second port is not in need of additional storage, a determination is made at 620 as to whether there is another port in the switch that has yet to be evaluated for storage allocation management. When there is another port, the process returns to 608 to determine whether storage allocation management is enabled for the other port, which will now be referred to as the second port. When none of the other ports need to be evaluated for storage allocation management, process 600 ends. As with before, process 600 may be started again at 602 when a period of time has passed.

The invention can take the form of an entirely hardware embodiment, an entirely software embodiment, or an embodiment containing both hardware and software elements. In one aspect, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 7:
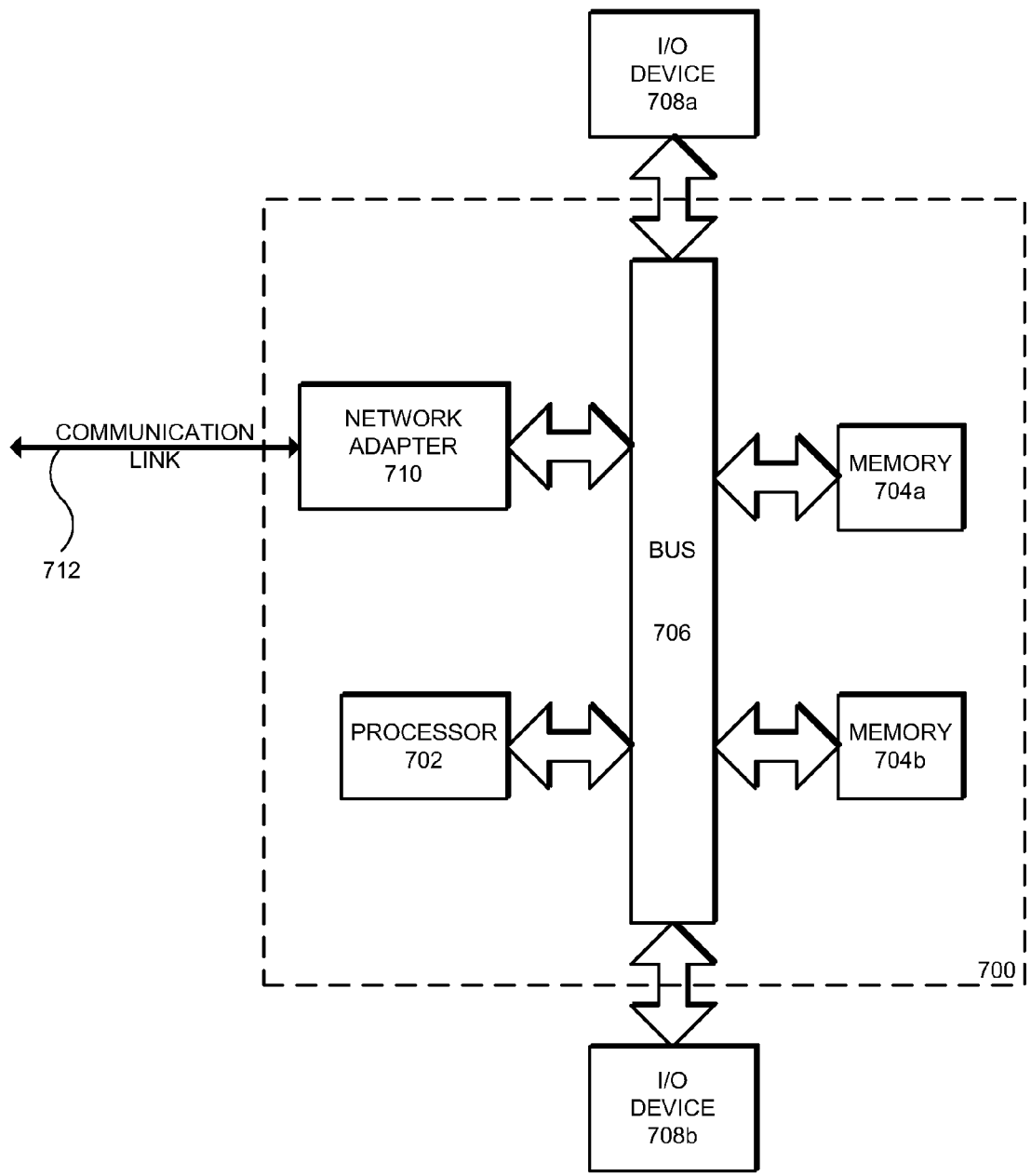
FIG. 7 is a block diagram of a data processing system with which embodiments of the present invention can be implemented.

FIG. 7 shows a data processing system 700 suitable for storing and/or executing program code. Data processing system 700 includes a processor 702 coupled to memory elements 704*a-b* through a system bus 706. In other embodiments, data processing system 700 may include more than one processor and each processor may be coupled directly or indirectly to one or more memory elements through a system bus.

Memory elements 704*a-b* can include local memory employed during actual execution of the program code, bulk storage, and cache memories that provide temporary storage of at least some program code in order to reduce the number of times the code must be retrieved from bulk storage during execution. As shown, input/output or I/O devices 708*a-b* (including, but not limited to, keyboards, displays, pointing devices, etc.) are coupled to data processing system 700. I/O devices 708*a-b* may be coupled to data processing system 700 directly or indirectly through intervening I/O controllers (not shown).

In the embodiment, a network adapter 710 is coupled to data processing system 700 to enable data processing system 700 to become coupled to other data processing systems or remote printers or storage devices through a communication link 712. Communication link 712 can be a private or public network. Modems, cable modems, and Ethernet cards are just a few of the currently available types of network adapters.

Various implementations for storage allocation management in switches have been described. Nevertheless, one of ordinary skill in the art will readily recognize that various modifications may be made to the implementations, and any variations would be within the spirit and scope of the present invention. For example, the above-described process flows are described with reference to a particular ordering of process actions. However, the ordering of many of the described process actions may be changed without affecting the scope or operation of the invention. Accordingly, many modifications may be made by one of ordinary skill in the art without departing from the spirit and scope of the following claims.

What is claimed is:

1. A system for managing allocation of storage in switches utilizing flow control in which an internal storage of the switch is assigned to each port of the switch in storage units, the system comprising:

a switch comprising a plurality of ports and an internal storage that is shared by the plurality of ports and is divided into a plurality of storage units, wherein each port is a physical interface to connect a computing device to the switch; and a controller in communication with the switch, the controller being operable to:

periodically monitor an average number of storage units used by each of the plurality of ports over a predetermined time period, set a threshold for the average number of storage units used by each of the plurality of ports, the threshold for each port being less than or equal to a total number of storage units assigned to the respective port, and allocate one or more available storage units assigned to a first of the plurality of ports to a second of the plurality of ports in response to storage allocation management being enabled for the second port and the average number of storage units used by the second port exceeding the threshold for the second port.

2. The system of claim 1, wherein the controller comprises a first controller and a second controller and at least one of the first controller and the second controller is integrated into the switch.

3. The system of claim 2, wherein the first controller is operable to monitor the average number of storage units used by each of the plurality of ports and set the threshold for each of the plurality of ports, and the second controller is operable to allocate the one or more available storage units from the first port to the second port.

4. The system of claim 1, further comprising:
a first register storing the average number of storage units used by each of the plurality of ports;
a second register storing the threshold for each of the plurality of ports; and
a table indicating the port assigned to each of the plurality of storage units,
wherein the first register, the second register, and the table are accessible to the controller.

5. The system of claim 1, wherein the controller is further operable to:
determine whether the threshold for the second port is greater than zero to determine whether storage allocation management is enabled for the second port.

6. The system of claim 1, wherein one or more storage units assigned to the first port are available for allocation when the average number of storage units used by the first port is less than the threshold for the first port or a preset percentage of the threshold for the first port.

7. The system of claim 1, wherein allocate one or more available storage units comprises:
reassign the one or more available storage units from the first port to the second port; and
update the total number of storage units assigned to and the threshold for the first port and the second port based on the reassignment of the one or more available storage units.

8. The system of claim 1, wherein the controller is further operable to:
reallocate the one or more available storage units from the second port back to the first port when a fixed period of time elapses or when the average number of storage units used by the first port reaches the threshold for the first port.

9. A computer program product comprising a computer readable storage medium, the computer readable storage medium including a computer readable program for managing allocation of storage in a switch utilizing flow control in which an internal storage of the switch is assigned to each port of the switch in storage units, the switch comprising a plurality of ports and an internal storage that is shared by the plurality of ports and is divided into a plurality of storage units, wherein the computer readable program when executed on a computer causes the computer to:
periodically monitor an average number of storage units used by each of the plurality of ports over a predetermined time period, wherein each port is a physical interface to connect a computing device to the switch;
set a threshold for the average number of storage units used by each of the plurality of ports, the threshold for each port being less than or equal to a total number of storage units assigned to the respective port; and
allocate one or more available storage units assigned to a first of the plurality of ports to a second of the plurality of ports in response to storage allocation management being enabled for the second port and the average number of storage units used by the second port exceeding the threshold for the second port.

10. The computer program product of claim 9, wherein the computer readable program when executed on the computer further causes the computer to:
determine whether the threshold for the second port is greater than zero to determine whether storage allocation management is enabled for the second port.

11. The computer program product of claim 9, wherein one or more storage units assigned to the first port are available for allocation when the average number of storage units used by the first port is less than the threshold for the first port or a preset percentage of the threshold for the first port.

12. The computer program product of claim 9, wherein allocate one or more available storage units comprises:
reassign the one or more available storage units from the first port to the second port; and
update the total number of storage units assigned to and the threshold for the first port and the second port based on the reassignment of the one or more available storage units.

13. The computer program product of claim 9, wherein the computer readable program when executed on the computer further causes the computer to:
reallocate the one or more available storage units from the second port back to the first port when an event occurs.

14. The computer program product of claim 13, wherein the event occurs when a fixed period of time elapses or when the average number of storage units used by the first port reaches the threshold for the first port.

15. The system of claim 1, wherein the switch is one of (i) a switch operably connected to one or more devices and a chipset; (ii) a switching equivalent in a root complex; or (iii) a switching equivalent in an I/O hub.

16. The computer program product of claim 9, wherein the switch is one of: (i) a switch operably connected to one or more devices and a chipset; (ii) a switching equivalent in a root complex; or (iii) a switching equivalent in an I/O hub.

* * * * *